April 9, 1968 G. E. McGINNIS 3,376,660

CIRCULATORY SYSTEM SIMULATOR

Filed July 12, 1965 2 Sheets-Sheet 1

WITNESSES
Theodore F. Wrobel
James T. Young

INVENTOR
Gerald E. McGinnis
BY
D. F. Shirtliff
AGENT

United States Patent Office 3,376,660
Patented Apr. 9, 1968

3,376,660
CIRCULATORY SYSTEM SIMULATOR
Gerald E. McGinnis, Pittsburgh, Pa., assignor to Westinghouse Electric Corporation, Pittsburgh, Pa., a corporation of Pennsylvania
Filed July 12, 1965, Ser. No. 471,173
6 Claims. (Cl. 35—17)

ABSTRACT OF THE DISCLOSURE

A simplified circulatory system simulator employing a pneumatically-operated pulsating diaphragm pump, for simulated heart pumping action, connected hydraulically via resilient flapper type check valves to cause circulation of blood-representing hydraulic fluid consecutively through two pneumatically-biased restrictedly-interconnected accumulators which represent the volume and resiliency characteristics of arteries and veins. Separate pressure regulating means provide for adjusting the pneumatic bias pressures in the two accumulators to simulate different blood pressures and blood system resiliency characteristics. Controls for pressure and repetition rate of pump operation provide for simulation of different heart beat rates and discharges.

In view of increasing interest in aiding and/or duplicating the functions of a human heart, it is a prime object of the present invention to provide simplified apparatus for simulating the blood pressure and flow conditions which can occur in the human body.

It is another object of the present invention to provide such a simulator apparatus which is characterized by inclusion of means to facilitate duplication of various blood pressure and flow characteristics which may occur in the human body.

In accord with the above objects the present invention comprises, in general, an oscillatory heart representing pump operable to discharge and accept blood-representing liquid alternately, in likeness to alternate systole-diastole discharge-reprime action of a beating heart; a pneumatically-biased expansible-volume arteries-representing accumulator into which the heart-representing pump discharges to simulate the pressure condition which prevails in the arteries of human blood circulatory systems; a pneumatically-biased expansible-volume veins-representing accumulator into which the arteries-representing accumulator empties and via which return flow of the liquid to the heart-representing pump occurs; heart-valve-representing check valve means prescribing the hydraulic circuit through which the blood-representing liquid flows and simulating the resilient characteristics of natural heart valves; a capillary-flow-representing adjustable flow restricting means interposed between the two accumulators to simulate the flow restrictive characteristics of capillary flow in an arterial network; simulated-diastolic-pressure regulating means for adjusting the pneumatic bias imposed on the liquid received by the arteries-representing accumulator; simulated-venous-pressure regulating means for adjusting the pressure of compressed air above the liquid in the veins representing accumulator from which such liquid returns during operation of the pump; simulated-miocardial-contractility regulating means for adjusting the operating force applied to the pump; simulated-heart-beat-rate regulating means for adjusting the rate of pulsed operation of the pump; and pressure-responsive transducer means to sense and enable representation of the simulated blood pressure conditions created in the apparatus.

Other objects, features, and advantages of the invention will become apparent from the following detailed description of an illustrative embodiment thereof when taken in connection with the accompanying drawings, in which.

Figure 1:
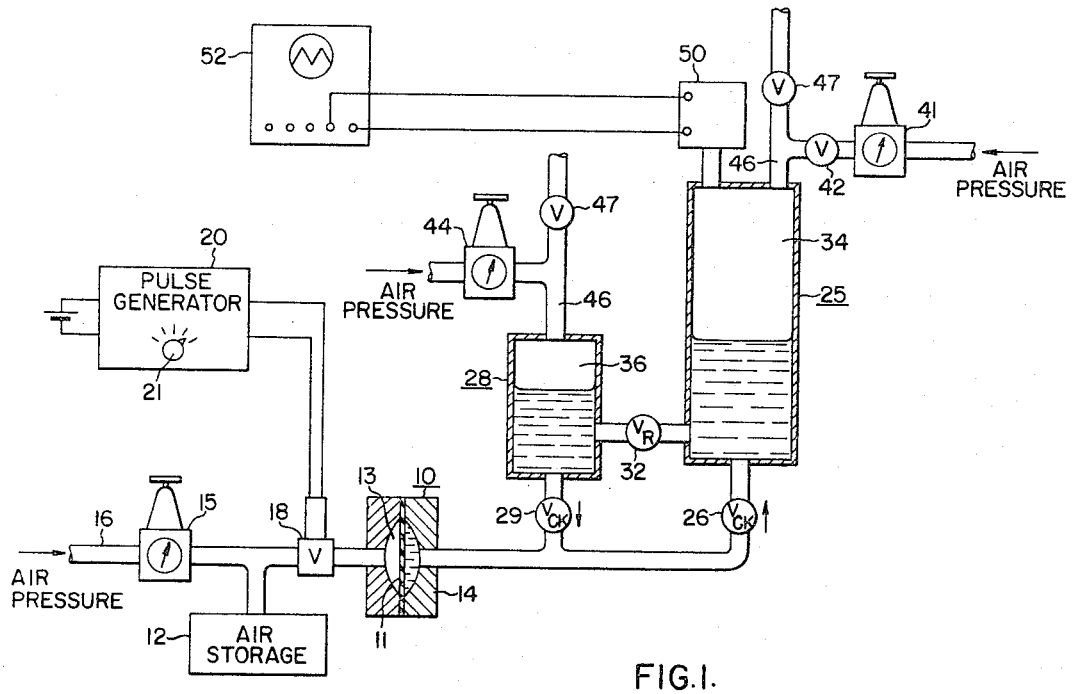
FIGURE 1 is a schematic representation of a circulatory system simulator apparatus constructed in accord with the present invention.

Referring to FIG. 1 in the drawings, the exemplified embodiment of the invention comprises an oscillatory heart-representing pump 10 such as of the type disclosed in copending United States patent application Ser. No. 455,377 filed May 13, 1965 titled "Blood Pumping Apparatus" which comprises a pneumatically-operated flexible diaphragm 11 of resilient material which is deflected by admittance of compressed air from a local storage chamber 12 into a diaphragm-operating chamber 13 to cause displacement of blood-representing liquid, such as water, from a discharge-inlet chamber 14 and which, between pulsed deflections, will be returned by back pressure into the discharge-inlet chamber upon alternate releases of compressed air from the diaphragm-operating chamber 13 for intermittent reprime of such discharge-inlet chamber between discharge deflections of such diaphragm. As in the apparatus of the aforementioned patent application, the local storage volume 12 is charged by way of a regulating valve device 15 connected to a compressed air supply line 16 and the presence of such local storage volume immediately adjacent to the diaphragm pump 10 enables supply of compressed air to the diaphragm operating chamber to be effected without delay.

Operation of the heart-representing diaphragm pump 10 is controlled by a solenoid valve device 18 which alternately establishes communication selectively between the diaphragm-operating chamber 13, the local storage volume 12, and the atmosphere, also as in the aforementioned patent application. Control of the solenoid valve device 18 is by means of a simulated-heart-beat-rate regulating means 20 for supplying pulses of energizing current to such solenoid valve device at selected rates, and such that the solenoid valve device will be energized to connect the local storage volume 12 to the diaphragm-operating chamber 13 for a period of from such as 15% to 25% of a given cycle of operation and to effect deenergization of such solenoid valve device to vent the diaphragm-operating chamber to the atmosphere for the remainder of a given cycle of its operation. Such period of energization of the solenoid valve device 18 and corresponding pressurization of the diaphragm-operating chamber 13 corresponds to the usual systole period of a human heartbeat and at the same time provides ample time for recharging of the local storage chamber 12 during each successive cycle of operation of the solenoid valve and of the heart-representing pump. Although not shown in detail, the regulating means 20 may simply comprise a switch operated by a rotary cam driven by a variable speed motor to intermittently make and break an energizing circuit for the solenoid valve device in accord with the desired duty cycle. The pulsing rate for the solenoid valve device and the diaphragm pump is preferably variable between 50 and 200 cycles per minute to correspond with a similar range of human heartbeat rates and is selectable by an operator's knob 21 which controls speed of the motor via such as a rheostat.

The discharge-inlet chamber 14 of the diaphragm-pump 10 is in hydraulic supply communication with a pneumatically-biased expansible-volume arteries-representing accumulator 25 by way of an aortic-valve-simulating check valve 26 as well as in hydraulic return communication with the lower end of a pneumatically-biased expansible-volume veins-representing accumulator 28 by way of a mitral-valve-simulating check valve 29. A capillary-flow-representing adjustable flow restricting means 32 establishes the hydraulic communication between the lower ends of the two accumulators.

During each successive liquid-displacing deflection of the diaphragm 11 blood-representing liquid will be displaced from the discharge-inlet chamber 14 to the lower end of the arteries-representing accumulator 25 by way of the aortic-valve-simulating check valve 26 against opposition of compressed air entrapped in an air-volume region 34 within such accumulator and above the liquid, thereby simulating the elastic properties of the arteries in the circulatory system of a human.

Alternately during each period of relaxation of the diaphragm 11 upon release of compressed air from the diaphragm-operating chamber 13, corresponding to the diastolic period of a human heartbeat, blood-representing liquid will flow from the arteries-representing accumulator 25 to the bottom of the veins-representing accumulator 28 against the bias of a volume of compressed air in an air-volume region 36 above the liquid in the latter accumulator by way of the capillary-flow-representing flow restricting means 32, and thence by way of the mitral-valve-simulating check valve 29 back to the discharge-inlet chamber 14 of the heart-representing pump 10.

The apparatus further comprises simulated-diastolic-pressure regulating valve means 41 for adjusting the pressure of the compressed air in region 34 above the liquid in the arteries-representing accumulator 25. Following adjustment of such pressure in the arteries-representing accumulator by the regulating valve means 41, such regulating valve means may be effectively isolated from such accumulator by closing of a stopcock 42.

The apparatus also comprises a simulated-venous-pressure regulating valve means 44 for adjusting the pressure of compressed air in region 36 above the liquid in the veins-representing accumulator 28.

Each accumulator is provided with a fill pipe 46 and stopcock 47 to enable introduction of the liquid initially into the system.

The apparatus is also provided with a pressure-responsive transducer 50 which may be situated, as shown in the drawing, to respond to the variations in pneumatic pressure experienced in region 34 in the arteries-simulating accumulator 25 to produce a visible pressure wave form on an oscilliscope 52, for example.

Figure 2:
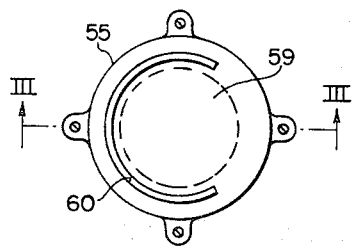
FIG. 2 is a plan view of a check valve construction employed in the apparatus of FIG. 1 to simulate the characteristics of valves found in a human heart.
Figure 3:
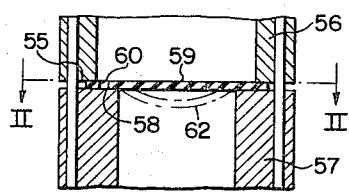
FIG. 3 is a cross-section view taken along the line 3—3 in FIG. 2.

The check valves 26 and 29 of FIG. 1 are shown schematically in FIGS. 2 and 3 as constructed to duplicate the yieldable aspects of the valves in the human heart, which are yieldable to a certain extent in the presence of the back pressure which they experience in their closed condition and which accounts for the dichrotic notch in the pressure wave form of a human heart beat. To obtain such simulated characteristic, each of the check valves 26 and 29 is constructed of a rubber disc 55 which is clamped at its outer periphery between two hollow casing sections 56 and 57 of different internal diameters which affords an annular seat 58 for a semi-circular flapper-valve 59 part of the disc. The flapper-valve 59 part of the rubber disc can be arrived at by cutting out a narrow semi-circular region 60 of such disc, and results in integral attachment of such flapper-valve with the peripheral clamped part thereof. The outer diameter of the flapper-valve 59 part is slightly greater than the inner diameter of the annular seat 58 formed by the lower casing member 57 so that a fluid pressure sealing relationship is obtained during back-flow-preventing pressure conditions and such flapper valve portion will be deflected slightly as indicated by the dotted lines 62 in FIG. 3. It will be appreciated that the check valve construction as shown in FIG. 3 will be inverted with respect to its use for the mitral-valve-simulating check valve 29 of FIG. 1.

By a suitable choice of pressure conditions and liquid and air volumes, the simulator apparatus is capable of simulating heart rates of from 50 to 200 strokes per minute; simulating heart discharge volumes of from 0 to 70 ccs.; of simulating diastolic pressures of from 0 to 350 mms. of mercury; of simulating systolic pressures within the same pressure range; and of simulating various peripheral resistances which may exist in a human circulatory system.

Figure 4:
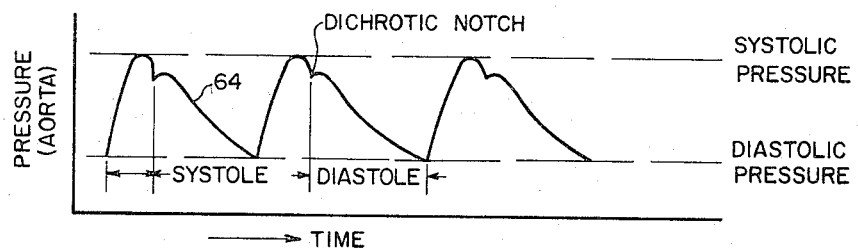
FIGS. 4, 5 and 6 are pressure wave forms which can be produced by the apparatus of FIG. 1 to simulate different blood pressure characteristics which may occur under various conditions and at various locations in a human circulatory system.
Figure 5:
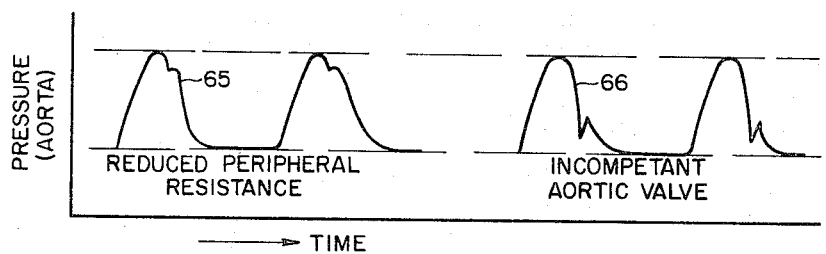

FIG. 4 illustrates a normal pressure wave shape 64 which can be simulated by the apparatus of FIG. 1. FIG. 5 illustrates possible variations in the blood pressure wave which can be simulated. For example, a reduced-peripheral-resistance wave shape 65 of the arterial network can be arrived at by adjustment of the flow restricting means 32 of FIG. 1, or an incompetent-aortic-valve shape 66 can be arrived at by altering the flapper valve 59 part of one of the check valves 26 and 29 as by introducing a slit or hole to simulate a leaking heart valve condition.

Figure 6:
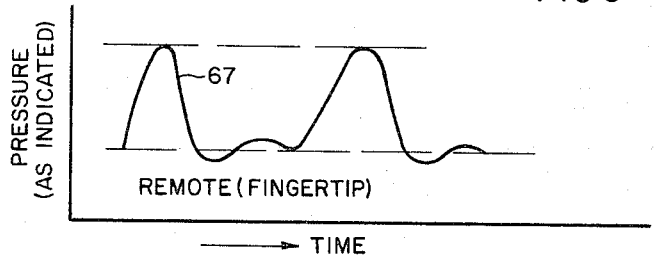

FIG. 6 shows a simulated blood pressure wave shape 67 such as may exist during a normal heart beat at a remote location such as the fingertip of a human. This can be arrived at by opening valve 42 to same extent to allow valve device 41 to dampen the pressure variation in region 34.

I claim as my invention:

1. Apparatus for simulating pressure and flow characteristics of the human circulatory system, comprising a pneumatically-operated pulsating diaphragm pump for alternately discharging and accepting blood-representing liquid; a pneumatically-biased arteries-representing accumulator into which the pump discharges; a pneumatically-biased veins-representing accumulator into which the arteries-representing accumulator empties and from which the blood-representing liquid is returned to the pump; a capillary-flow-representing adjustable flow restricting means establishing hydraulic communication between the two accumulators; and a pair of resilient flapper-type check valves prescribing the hydraulic circuit through which the blood-representing liquid flows.

2. The apparatus of claim 1, further comprising air pressure regulating valve means for adjusting the pressure of compressed air in the aforesaid accumulators to vary the pneumatic bias imposed on the liquid admitted thereto; and isolation valve means to close off the accumulators from the regulating valve means following an adjustment of such pneumatic bias.

3. The apparatus of claim 1, further comprising pressure-responsive transducer means to sense and enable representation of the simulated blood pressure conditions created within the apparatus.

4. The apparatus of claim 1, further comprising simulated-miocardial-contractility regulating means for adjusting the operating force applied to the pump; and simulated-heart-beat-rate regulating means for adjusting the repetition rate of pulsed pneumatic fluid operating the pump.

5. Apparatus for simulating pressure and flow characteristics of the human circulatory system; comprising a pneumatically-operated diaphragm pump operable pulsedly to alternately discharge and accept blood-representing liquid; a pneumatically-biased arteries-representing accumulator into the bottom of which the liquid displaced by the pump flows against the elastic bias of pressurized gas to simulate the elastic properties of human arteries and the diastolic pressure conditions prevailing during such inlet flow; a capillary-flow-representing adjustable flow restricting means via which liquid exits from the arteries-representing accumulator; a pneumatically-biased veins-representing accumulator connected to receive the liquid passed through the flow restricting means against the elastic bias of pressurized gas to simulate the elastic properties of human veins and the venous pressure conditions prevailing during such flow; heart-valve-representing resilient flapper-type check valve means connected to prescribe an hydraulic flow circuit from the pump to the arteries-representing accumulator and from the veins-representing accumulator back to the pump; a local pneumatic storage volume disposed adjacent to the pump to store compressed gas for operating same; a solenoid valve device energizable cyclically to communicate the pump alternately between the storage volume and the atmosphere for pulsed supply and release of pump-operating compressed gas; control means for effecting the cyclical energization of the solenoid valve device at selectable rates; and pressure regulating valve means establishing a pressure-regulated supply communication for the storage volume.

6. The apparatus of claim 5, further comprising regulating valve means for separately adjusting the average pressures of compressed gas in the two accumulators.

References Cited

UNITED STATES PATENTS

| 2,556,043 | 6/1951 | Roucka | 35—17 |
| 2,652,831 | 9/1953 | Chesler | 128—214 |

FOREIGN PATENTS

| 76,815 | 2/1918 | Switzerland. |

EUGENE R. CAPOZIO, *Primary Examiner.*

H. S. SKOGQUIST, *Assistant Examiner.*